(No Model.)

F. G. BOTSFORD.
STEAM TRAP.

No. 381,670. Patented Apr. 24, 1888.

Witnesses.

Inventor.
Frederick G. Botsford.
By [signature]
Atty.

UNITED STATES PATENT OFFICE.

FREDERICK G. BOTSFORD, OF ERIE, PENNSYLVANIA, ASSIGNOR, BY MESNE ASSIGNMENTS, TO THE ERIE CAR HEATING COMPANY, OF SAME PLACE.

STEAM-TRAP.

SPECIFICATION forming part of Letters Patent No. 381,670, dated April 24, 1888.

Application filed April 23, 1887. Serial No. 235,927. (No model.)

*To all whom it may concern:*

Be it known that I, FREDERICK G. BOTSFORD, a citizen of the United States, residing at Erie, in the county of Erie and State of Pennsylvania, have invented a certain new and useful Improvement in Steam-Traps; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvement in steam-traps hereinafter set forth in the specification and claims, and illustrated in the accompanying drawings, in which—

Figure 1:
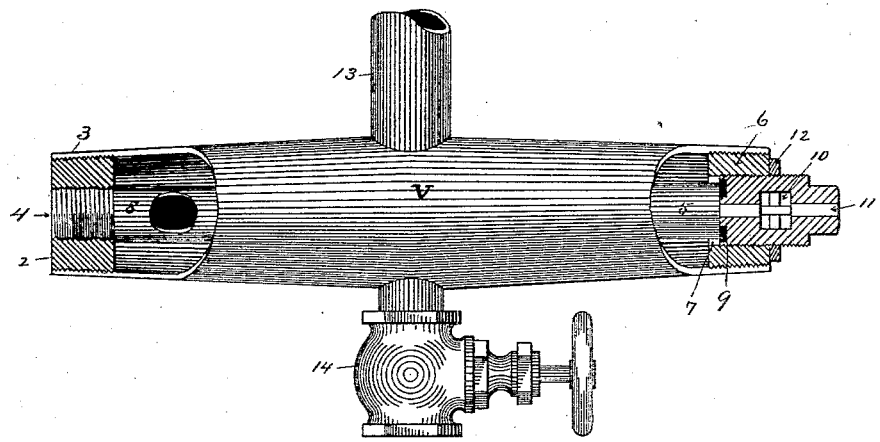
Figure 2:
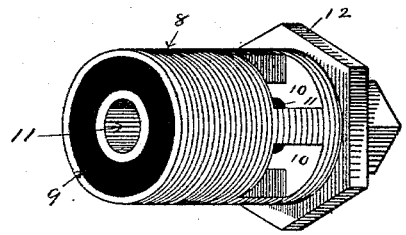

Figure 1 shows a view of my improved steam-trap in elevation, with sections of the shell broken away at the ends, showing the interior thereof. Fig. 2 shows a perspective view of the adjustable valve-seat mechanism thereof.

Like letters or figures refer to like parts in both figures.

This trap V, I construct preferably as follows, viz: The body 1 of the trap I make in the form of a hollow cylinder, the central portion of which I make of somewhat larger diameter than the ends thereof. In the ends of this cylinder I screw bushings 2 and 6. In the bushing 2, in the end 3 of the body 1, I screw a pipe, 5, of brass or other metal capable of a considerable degree of expansion when heat is applied thereto. This tube or pipe 5 is open at both ends and extends through the central part of the trap-body 1 into the end of the bushing 6, the opening through the center of this bushing being larger than the outside diameter of the end of the pipe 5. On the inner end of the bushing 6 are inwardly-projecting lugs 7, between which the end of the pipe operates and which act as guides therefor. From the lugs 7 to the outer end thereof the opening in the bushing 6 is screw-threaded to fit the screw-thread on the valve-plug 8, Fig. 2, which fits therein. The inner end of the valve-plug 8, forming a hollow or annular valve seat, is provided with a gasket, 9, of suitable steam-packing, against which the free end of the pipe 5 operates to close the trap by the longitudinal expansion thereof. Through the center of the hollow valve seat and plug 8 there is an opening, 11, which extends from end to end thereof, so that when in place there is a continuous opening through the bushing 2, the pipe 5, and the valve seat and plug 8, for the circulation of air to facilitate the speedy cooling of the pipe 5. In the central part of the valve-plug 8 I make two or more radial slots, 10, which communicate with the central opening, 11, therein, which openings 10 extend beyond the end of the bushing 6 when the valve-plug 8 is in place, so as to leave abundant openings for the escape of water from the trap. On the outside of the outer end of the valve-plug 8 I place a jam-nut, 12, which I screw up against the outer end of the bushing 6, when the valve-plug 8 is properly adjusted, to prevent its being moved out of place. In the central part of the upper side of the trap-body 1 I make an inlet-opening, into which a nipple, 13, is secured for connecting the trap V with a steam-pipe conveying steam thereto.

Having thus fully described my improvement, so as to enable others to construct and operate the same, what I claim as new, and desire to secure by Letters Patent of the United States, is—

1. The combination, in a steam-trap, of a tubular body adapted to retain steam and water, having an expansion-tube secured in one end thereof, with an annular or hollow valve-seat secured in the opposite end of said body, against which the open end of said expansion-tube operates, so that the air will circulate entirely through said expansion-tube and valve-seat, substantially as and for the purpose set forth.

2. The combination, in a steam-trap, of a hollow tubular body having a bushing, 2, in one end thereof, into which bushing an expansion-pipe, 5, is secured, with a bushing, 6, having guides 7 therein, and the adjustable valve-plug 8, substantially as and for the purpose set forth.

3. The combination, in a steam-trap for car-heating, of a hollow tubular body having a tubular expansion-pipe, 5, secured therein, with the hollow adjustable valve-plug 8, constructed substantially as shown, and for the purpose set forth.

In testimony whereof I affix my signature in presence of two witnesses.

FREDERICK G. BOTSFORD.

Witnesses:
W. W. SIMPSON,
H. J. CURTZE.